United States Patent Office 2,910,345
Patented Oct. 27, 1959

2,910,345

SEPARATION OF POLONIUM, PROTACTINIUM OR MIXTURES THEREOF IN AQUEOUS SOLUTION FROM BISMUTH, LEAD, ZIRCONIUM AND/OR COLUMBIUM VALUES

Quentin Van Winkle, Oak Ridge, Tenn., and Kurt A. Kraus, Columbus, Ohio, assignors to the United States of America as represented by the United States Atomic Energy Commission No Drawing. Application September 12, 1950
Serial No. 184,518

14 Claims. (Cl. 23—14.5)

This invention deals with the recovery of polonium and in particular with the solvent extraction of polonium values from aqueous solutions.

It is an object of this invention to provide a process for separating polonium values from those of protactinium, ionium, zirconium, columbium, bismuth, lead and/or a mixture thereof contained in aqueous solutions.

This and other objects are accomplished by acidifying the polonium values-containing solutions and equilibrating them with a substantially water-immiscible organic solvent, whereby the polonium values are taken up by an extract solvent phase.

Aliphatic oxygen-containing organic solvents in particular alcohols, ketones, esters and polyethers which have at least six carbon atoms have been found especially well suitable for the process of this invention. Examples of satisfactory solvents are: diisopropyl ketone, methyl n-amyl ketone, methyl isobutyl ketone (hexone), ethyl acetate, amyl acetate, tributyl phosphate, dibutyl ether of diethylene glycol (dibutyl "Carbitol"), diethyl ether of ethylene glycol, dibutyl ether of tetraethylene glycol and mixtures thereof. A mixture of 20% tributyl phosphate and 80% dibutyl ether, for instance, has given satisfactory results.

It is advantageous to add a salting-out agent to the acid solution prior to extraction whereby the degree of extraction is considerably increased. In the case of a nitric acid solution, water-soluble nitrates such as alkali nitrates, alkaline earth metal nitrates and manganese nitrate have been found satisfactory. Nitric acid by itself also acts as a salting-out agent. If hydrochloric acid is the acidifying agent, water-soluble chlorides are preferred as the salting-out agents.

All mineral acids are suitable for the process of this invention and in particular hydrochloric acid and nitric acid; the latter is preferred. The acid concentration may range from 0.1 to 10 N, the higher concentrations yielding the better extraction values. The relationship between degree of extraction and hydrochloric acid concentration is shown in Table I where aqueous solutions, each containing a tracer quantity of polonium ($Po^{210}$) as polonium chloride and containing hydrochloric acid in a concentration of 3 N, 6 N, and 9 N, respectively, were equilibrated with an equal volume of diisopropyl ketone.

TABLE I

| Concentration of HCl, N | 3 | 6 | 9 |
|---|---|---|---|
| Percent Po extracted | 69 | 95 | 98 |

The ratio of organic solvent to aqueous solution is dependent upon the polonium content of the aqueous solution; it is understood, though, that a sufficient quantity of solvent preferably is used to make extraction of the entire quantity of polonium possible. Ratios ranging from 10:1 to 1:10 for solvent to aqueous solution have been found suitable. In most cases, equal volumes of organic solvent and aqueous solution were found satisfactory.

Sufficient contacting time between the organic solvent and aqueous solution must be allowed in order to obtain the distribution equilibrium; this is usually reached after several minutes.

While the extraction can be carried out at any temperature below the boiling points of the liquids, operation at room temperature is preferred.

In the following, a few examples are given in order to illustrate the extraction process of this invention.

*Example I*

An aqueous solution containing 1 N $HNO_3$, 1 M $Mn(NO_3)_2$ and polonium nitrate in tracer concentration was equilibrated at room temperature with an equal volume of diisopropyl ketone; the solvent phase formed was analyzed for its polonium content. An extraction of 7% was ascertained. It was found that by increasing the $HNO_3$ concentration, the polonium extraction could be enhanced considerably.

*Example II*

Five cc. of an aqueous solution containing 10γ of a solution having a tracer concentration of polonium (2,298 counts per minute), 1 N $HNO_3$ and 0.5 N $Mn(NO_3)_2$, were equilibrated with 5 cc. of diisopropyl ketone by shaking the mixture for ten minutes. An aliquot of 2 cc. of the solvent phase formed was distilled with steam and analyzed for its polonium content. It was found that the 5 cc. of solvent contained 18.6% of the polonium initially present.

*Example III*

In another experiment, a 6 N HCl aqueous solution containing tracer concentration of equilibrium radium D was extracted with a mixture of 20% tributyl phosphate in dibutyl ether. Analysis of the solvent extract phase formed showed that all of the polonium was extracted while $Bi^{+++}$ and $Pb^{++}$ values remained in the aqueous solution.

*Example IV*

Aqueous solutions of tracer zirconium ($Zr^{95}$) and columbium ($Cb^{95}$) chlorides having varying concentrations of HCl were equilibrated with equal volumes of diisopropyl ketone. The extraction results are given in Table II.

TABLE II

| HCl concentration, N | 3 | 6 | 9 |
|---|---|---|---|
| Percent Zr and Cb Extracted | 0.3 | 1.3 | 10 |

These results show that zirconium and columbium are extracted to a negligible degree only when the HCl concentration is below 6 N. This makes it possible to separate polonium from zirconium and columbium values, since polonium is extracted, as shown in Table I, to a considerable degree from solutions having an acidity below 6 N.

*Example V*

Five cc. of an aqueous solution 1 N in $HNO_3$, 1 N in $Mn(NO_3)_2$, and containing tracer concentrations of zirconium and columbium nitrates was shaken with an equal volume of diisopropyl ketone. The solvent extract phase formed was separated from the aqueous phase and analyzed for the total content of zirconium plus columbium. The result of the analysis showed that 0.2% only of zirconium and columbium had been extracted into the solvent phase. This low extractability together with the showing of Example II provides an easy and satisfactory means for separating polonium from zirconium and columbium values all contained in an aqueous solution similarly to the separation from zirconium and columbium mentioned in Example IV.

The process of this invention has a great many uses. For instance, in addition to the uses already mentioned, it may be advantageously applied to the separation of protactinium and polonium values from aqueous solutions. For this purpose, the aqueous solution to be treated is given a high acid concentration and preferably of at least 5 N; upon contact with one of the solvents defined above both, protactinium and polonium, are extracted to a high degree. From the solvent phase thus obtained, the polonium values may then be separated by back-extracting with an acid solution containing considerably less than 5 N $HNO_3$, for instance with 1 N $HNO_3$, whereby the protactinium is not affected and remains in the solvent phase while all of the polonium is back-extracted into the aqueous $HNO_3$.

The process of this invention is also very valuable in the separation of various elements contained in uranium ores, such as pitchblende. One of the methods frequently used for recovering the various elements contained in pitchblende comprises dissolving the ore in a mixture of nitric acid and sulfuric acid, whereby the uranium, protactinium, polonium and thorium are dissolved, and precipitating, as the so-called "carbonate residue," the protactinium, polonium and thorium leaving the uranium in solution. This precipitate is then treated with nitric acid whereby most of the polonium and thorium are dissolved while most of the protactinium with only slight quantities of polonium and thorium remain in a residue. The solution which mainly contains polonium and thorium may then be treated by the process of the invention for the recovery of polonium values.

The residue consisting predominantly of protactinium carbonate, but containing some polonium and thorium values, is dissolved by treatment with hydrofluoric acid and nitric acid and the protactinium is then removed by carrier precipitation on zirconium iodate. The carrier precipitate, which also contains the residual small quantities of polonium and thorium, is dissolved in nitric acid; this solution may then also be treated by the process of this invention for further separation and purification of the protactinium from polonium and thorium values.

It will be understood that this invention is not to be limited to the details given herein but that it may be modified within the scope of the appended claims.

What is claimed is:

1. A process of separating a mineral acid salt of a metal selected from the group consisting of polonium, protactinium and a mixture of polonium and protactinium from an aqueous solution of said metal salt and also containing at least one of the values selected from the group consisting of bismuth, lead, zirconium and columbium values, comprising providing hydrochloric acid in said solution in a concentration of at least 5 N; contacting said aqueous solution with a substantially water-immiscible organic solvent; and separating an aqueous phase containing said values from an organic extract phase containing said metal salt.

2. The process of claim 1 wherein the aqueous solution contains a salting-out agent.

3. The process of claim 2 wherein the mineral acid is nitric acid and the salting-out agent is a water-soluble nitrate.

4. The process of claim 1 wherein the solvent is diisopropyl ketone.

5. The process of claim 1 wherein the solvent is tributyl phosphate.

6. The process of claim 1 wherein the solvent is a mixture of tributyl phosphate and dibutyl ether.

7. The process of claim 1 wherein the solvent is hexone.

8. The process of claim 1 wherein said aqueous solution contains both polonium and protactinium salt and wherein said organic extract phase is contacted with an aqueous mineral acid solution of a concentration lower than 5 N whereby said polonium salt is back-extracted into said aqueous mineral acid solution while the protactinium salt is retained in said organic extract phase.

9. The process of claim 1 wherein the organic solvent contains oxygen and has at least six carbon atoms.

10. A process for separating polonium values from protactinium values contained in an aqueous solution, comprising acidifying said aqueous solution to obtain an acid concentration of at least 5 N, contacting said aqueous solution with a substantially water-immiscible organic solvent whereby said protactinium values and polonium values are taken up by a solvent extract phase, separating said solvent extract phase, and contacting said extract phase with an acid solution substantially less than 5 N in nitric acid whereby said polonium values are re-extracted into an aqueous phase while said protactinium values remain in said extract phase.

11. The process of claim 10 in which the solution substantially less than 5 N in nitric acid is about 1 N nitric acid.

12. A process for separating polonium values from zirconium and columbium values contained in an aqueous solution, comprising acidifying said solution with mineral acid to obtain a mineral acid concentration of about 6 N, contacting said aqueous solution with a substantially water-immiscible organic solvent whereby said polonium values are taken up by an organic extract phase while said zirconium and columbium values preferentially remain in aqueous solution, and separating said organic extract phase.

13. A process of separating protactinium values from polonium values contained in an organic solution comprising contacting said organic solution with an aqueous mineral acid of a concentration below 5 N whereby the polonium is back-extracted into said aqueous acid while the protactinium is retained in the organic solvent.

14. A process of separating a mineral acid salt of polonium from an aqueous solution containing it and also at least one of the values selected from the group consisting of bismuth, lead, zirconium and columbium values, comprising providing mineral acid in said solution in a concentration of at least 5 N; contacting said aqueous solution with a substantially water-immiscible organic solvent; and separating an aqueous phase containing said values from an organic extract phase containing said polonium salt.

References Cited in the file of this patent
UNITED STATES PATENTS 2,227,833     Hixson et al.  ----------- Jan. 7, 1941

OTHER REFERENCES

Thompson: AECD–1897, February 1948, declassified April 15, 1948, 4 pages.

Hagemann: Journal of the American Chemical Society, vol. 72, pp. 768–771 (February 1950).

Katzin: TID–5223 (part 1), 1952, pages 197–222, which reports a paper by Hyde and Wolfe on work reported in CB–3810, prepared for publication April 30, 1947.